United States Patent Office 3,565,891
Patented Feb. 23, 1971

3,565,891
MANNICH BASES OF 3-TROPANYL 2-(HYDROXYPHENYL) ACRYLATES
Henry C. Caldwell, Ambler, and William G. Groves, Norristown, Pa., assignors to Smith Kline & French Laboratories, Philadelphia, Pa., a corporation of Pennsylvania
No Drawing. Filed May 2, 1968, Ser. No. 726,220
Int. Cl. C07d 43/12
U.S. Cl. 260—240
10 Claims

ABSTRACT OF THE DISCLOSURE

Mannich bases of 3-tropanyl 2-(hydroxyphenyl)acrylates having gastorintestinal spasmolytic activity. The basic moiety on the 2-(hydroxyphenyl) group being morpholinomethyl, piperidinomethyl, di(loweralkyl)aminomethyl, methylpiperidinomethyl, 4-methyl-1-piperazinylmethyl, pyrrolidinomethyl, 3-azabicyclo[3.2.2]nonyl-3-methyl and 4-piperidino-piperidinomethyl. The method of preparation comprises reacting the properly substituted 3-tropanyl 2(hydroxyphenyl)acrylate with formaldehyde and the desired amine.

---

This invention relates to novel 3-tropanyl-2(hydroxyphenyl)acrylate Mannich bases which have useful pharmacodynamic activity. More specifically, the compounds of this invention possess gastrointestinal spasmolytic activity as demonstrated in standard animal pharmacological test procedures. For example, in the modified Janssen test for the inhibition of fecal pellet count, spasmolytic activity was observed at doses of 16.9 mg./kg. to 172 mg./kg. administered orally to mice. Specifically, 3-tropanyl-2-(4-hydroxy-3-morpholinomethylphenyl)-3-phenylacrylate dihydrochloride demonstrated spasmolytic activity at 80 mg./kg. in mice.

These novel compounds are particularly advantageous because they produce the spasmolytic activity without the concomitant mydriatic and antisalivary side effects which are common to known anticholinergic-antispasmodic drugs. Prior to the present invention, there has been a great need for compounds which produce spasmolytic activity without the usual anticholinergic side effects, such as, for example, dry mouth, blurred vision and urinary retention which are common to known anticholinergic-antispasmodic drugs. The need of safe and effective compounds free of the above-noted side effects and having spasmolytic activity has been great.

The novel 3-tropanyl-2-(hydroxyphenyl)acrylate Mannich bases of this invention are represented by the following general formula:

Formula 1

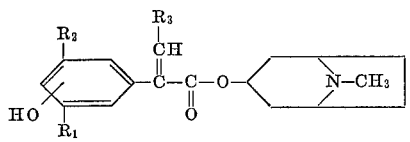

when:

$R_1$ represents morpholinomethyl, piperidinomethyl, di-(loweralkyl)aminomethyl, methylpiperidinomethyl, 4-methyl-1-piperazinylmethyl, pyrrolidinomethyl, 3-azabicyclo[3.2.2]nonyl-3-methyl, or 4-piperidinopiperidinomethyl;

$R_2$ represents hydrogen or $R_1$; and $R_3$ represents hydrogen, phenyl or substituted phenyl in which the substituents are lower alkyl, lower alkoxy halogen such as chloro, bromo or fluoro, hydroxy, nitro, cyano and trifluoromethyl, furyl, thienyl and pyridyl.

By lower alkyl and lower alkoxy is meant a straight or branched chain preferably of from 1 to 6 carbon atoms.

Advantageous compounds of this invention are represented by the above structural formula when $R_1$ represents di(loweralkyl)aminomethyl, morpholinomethyl and piperidinomethyl, $R_2$ represents hydrogen and $R_3$ represents phenyl.

The preferred and most advantageous compound of this invention is represented by the following structural formula:

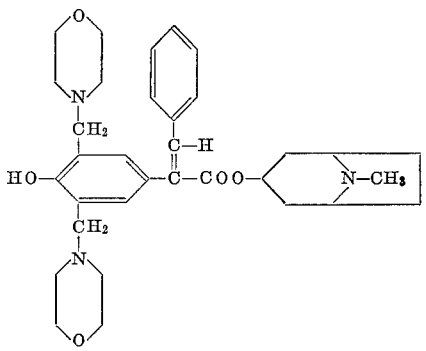

The 3-tropanyl 2(hydroxyphenyl)acrylate Mannich bases are prepared according to the following synthetic procedure:

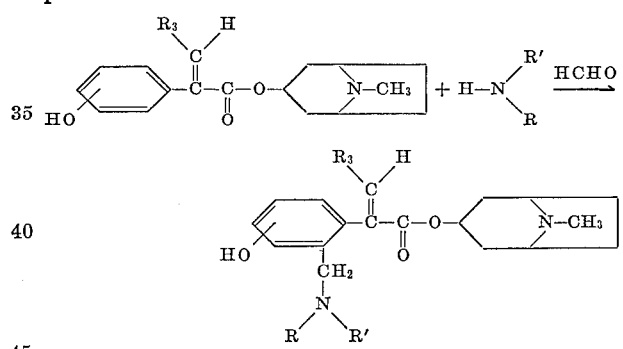

The method is carried out using readily available starting materials and gives excellent yields of the end product. Where certain compounds desired for use as starting materials are not available, they can be prepared by methods described in the literature and well known to the art. For example, the 3-tropanyl-2(hydroxyphenyl)acrylate can be prepared by converting the properly substituted phenylacetic acid to the corresponding phenylacrylic acid which is then reacted with tropine as fully described in U.S. Pat. No. 3,317,544.

The 3-tropanyl 2(hydroxyphenyl)acrylate is converted to the desired Mannich base by reacting with formaldehyde and the proper amine in an organic solvent such as isoamyl, amyl or butyl alcohol. The mixture is refluxed and the solvent removed to yield the desired 3-tropanyl 2(hydroxyphenyl)acrylate Mannich base.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well known to the art.

Further, exemplary of salts are nontoxic quaternary ammonium salts of the above defined bases formed with pharmacologically acceptable lower alkyl or aralkyl esters of, for example, sulfuric, hydrohalic and aromatic sufonic acids. These salts are prepared by treating a solution of the base in a suitable solvent, such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such reactive esters are lower alkyl halides of a maximum of eight carbon atoms such as methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene sulfate and ethyl toluene sulfonate.

It will be readily apparent to one skilled in the art that variations of these procedures are possible. The preferable preparative procedures are the methods discussed above.

The tropanyl derivatives of this invention are preferably employed in combination with either a liquid or solid nontoxic pharmaceutical carrier. A wide variety of pharmaceutical forms useful for oral ingestion may be employed. Advantageously the preparation may take the form of tablets, capsules, powders, troches or lozenges. When a solid form is employed the pharmaceutical carrier may be, for example, lactose, magnesium stearate, starch, gums such as acacia, terra alba, stearic acid, sorbitol, mannitol, ethyl cellulose or gelatin. The amount of solid carrier will vary widely but preferably is from about 25 mg. to about 1 gm. If a liquid carrier is used the preparation can be in the form of a soft gelatin capsule, placed in an ampule or in a liquid suspension.

The novel compounds of this invention are administered usually in dosage units, internally, preferably orally to animals, in effective but nontoxic amounts to induce the desired pharmacodynamic effect. Advantageously equal daily doses are administered to provide a daily dosage regimen which produces antispasmodic activity without the extremely disadvantageous side effects of the anticholinergic antispasmodics of the prior art.

The following examples are not limiting but are illustrative of compounds of this invention and the procedures for their preparation. Other variations of this invention will be obvious to those skilled in this art.

EXAMPLE 1

To a mixture containing 15.2 g. of p-hydroxyphenylacetic acid, 11 ml. of benzaldehyde and 16.2 ml. of triethylamine is added with cooling 44 ml. of acetic anhydride. The mixture is stirred for approximately ½ hour and then heated in an oil bath at 70° C. The temperature is raised to 100° C. over a ½ hour period and heating continued for approximately five hours. The solution is cooled and made acidic with concentrated hydrochloric acid. The crude acid is filtered, dried and recrystallized from alcohol to yield 2-p-hydroxyphenyl-3-phenylacrylic acid.

A suspension of 13 g. of 2-p-hydroxyphenyl-3-phenylacrylic acid, 20 ml. of dry benzene and 10 ml. of thionyl chloride is warmed gently until a solution results. The clear solution is refluxed for about an hour and the excess thionyl chloride and benzene is removed by aspirator. The solution is further washed with three separate portions of dry benzene. To the resulting oil is added 12 g. of tropine hydrobromide and the mixture is then chilled. To this mixture is added 20 ml. of dry pyridine and the solution is stirred for about ½ hour at room temperature and then at 60° C. to 70° C. for one hour. The mixture solidifies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-hydroxyphenyl-3-phenylacrylate.

A mixture of 5.19 g. of 3-tropanyl-2-p-hydroxyphenyl-3-phenylacrylate, 1.27 ml. of Formalin and 1.37 ml. of morpholine in 50 ml. of isoamyl alcohol is heated at reflux temperature for 3 hours and the solvent is removed at reduced pressure to yield 3-tropanyl 2(4-hydroxy-3-morpholinomethylphenyl)-3-phenylacrylate. The residue is dissolved in ether and reacted with hydrogen chloride to yield the dihydrochloride salt having a melting point at about 187° C. with decomposition.

EXAMPLE 2

A mixture of 7.26 g. of 3-tropanyl-2-p-hydroxyphenyl-3-phenylacrylate (as prepared in Example 1), 3.56 ml. of Formalin and 3.28 ml. of morpholine in 50 ml. of isoamyl alcohol is heated at reflux temperature for 3 hours and the solvent is removed in vacuo to yield 3-tropanyl 2(4-hydroxy-3,5-dimorpholinomethylphenyl)-3-phenylacrylate. An ethereal solution of the free base is reacted with hydrogen chloride to give the trihydrochloride salt having a melting point at about 160° C. with decomposition.

EXAMPLE 3

To a mixture containing 20.0 g. of 5-nitro-2-hydroxyphenylacetic acid, 11 ml. of benzaldehyde and 16.2 ml. of triethylamine is added with cooling 47 ml. of acetic anhydride. The mixture is stirred for approximately ½ hour and then heated in an oil bath at 70° C. The temperature is raised to 100° C. over a ½ hour period and heating continued for approximately five hours. The solution is cooled and made acidic with concentrated hydrochloric acid. The crude acid is filtered, dried and recrystallized from alcohol to yield 2(5-nitro-2-hydroxyphenyl)-3-phenylacrylic acid.

A suspension of 17 g. of 2(5-nitro-2-hydroxyphenyl)-3-phenylacrylic acid, 23 ml. of dry benzene and 15 ml. of thionyl chloride is warmed gently until a solution results. The clear solution is refluxed for about an hour and the excess thionyl chloride and benzene is removed by aspirator. The solution is further washed with three separate portions of dry benzene. To the resulting oil is added 13.3 g. of tropine hydrobromide and the mixture is then chilled. To this mixture is added 20 ml. of dry pyridine and the solution is stirred for about ½ hour at room temperature and then at 60° C. to 70° C. for one hour. The mixture solidifies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3 - tropanyl-2(5-nitro-2-hydroxyphenyl)-3-phenylacrylate.

A mixture of 10.0 g. of 3-tropanyl 2(5-nitro-2-hydroxyphenyl)-3-phenylacrylate, 2.2 ml. of formalin and 2.4 ml. of morpholine in 100 ml. of isoamylalcohol is treated at reflux temperature for 3 hours and the solvent is removed at reduced pressure. The free base is recrystallized from carbon tetrachloride to yield 3-tropanyl 2(2-hydroxy-5-nitro-3-morpholinomethylphenyl)-3-phenylacrylate.

EXAMPLE 4

Following the procedure of Example 1, 1.34 g. of piperidine, 1.15 g. of diethylamine, 1.56 g. of 4-methylpiperidine, 1.58 g. of N-methylpiperazine, 1.12 g. of pyrrolidine and 1.96 g. of 3-azabicyclo[3.2.2]nonane were substituted for morpholine to yield respectively 3-tropanyl-2(4 - hydroxy - 3 - piperidinomethylphenyl)-3-phenylacrylate, 3-tropanyl (2(4-hydroxy-3-diethylaminomethylphenyl)-3-phenylacrylate, 3-tropanyl 2[4-hydroxy-3-(4-methylpiperidinomethyl)phenyl] - 3 - phenylacrylate, 3-tropanyl 2 - [4-hydroxy-3-(4-methyl-1-piperazinylmethyl)phenyl]-3 phenylacrylate, 3-tropanyl 2(4-hydroxy-3-pyrrolidinomethylphenyl)-3-phenylacrylate and 3-tropanyl 2[4-hydroxy - 3 - (3 - azabicyclo[3.2.2]nonyl-3-methyl)phenyl]-3-phenylacrylate.

EXAMPLE 5

Similarly following the procedure of Examples 1 and 4, the following were employed in place of benzaldehyde as starting materials: 4-pyridylcarboxaldehyde, 2-furfural and 2-thiophenealdehyde to yield respectively the 3-(4-pyridyl)acrylate, 3-(2-furyl)acrylate and 3-(2-thienyl) acrylate derivatives of the Mannich base, such as, for example, 3 - tropanyl-2(4-hydroxy-3-diethylaminomethylphenyl)-3-(4-pyridyl)acrylate, 3-tropanyl 2(4-hydroxy-3-pyrrolidinomethylphenyl) 3-(2-furyl)acrylate and 3-tropanyl 2(4 - hydroxy - 3 - piperidinomethylphenyl) - 3-(2-thienyl)acrylate.

EXAMPLE 6

To a mixture under nitrogen containing 500 ml. of anhydrous ether, 27.6 g. of magnesium turnings and 11 drops of ethyl bromide is added 15 ml. of isopropyl chloride. The mixture is warmed until the reaction proceeds and 87 ml. more of isopropyl chloride is added and the mixture refluxed moderately for approximately one hour. A solution of 83 g. of o-methoxyphenylacetic acid in 500 ml. of dry benzene is then added and the mixture further refluxed for approximately two hours. 50 g. of paraformaldehyde is then distilled into the mixture with the aid of a stream of dry nitrogen. The thick solution is stirred for about an hour after the formaldehyde distillation is completed and the mixture then poured into ice and 200 ml. of concentrated sulfuric acid, stirred and cooled to about 5° C. The crude solid is then filtered, recrystallized from water and dried at 40° C. in vacuo. The solid is then purified by treating with benzene, dissolving in hot water and extracting once again with benzene until aqueous layer is colorless. The aqueous solution is cooled and precipitate filtered yielding o-methoxytropic acid as a white solid.

19.6 g. of o-methoxytropic acid and 50 ml. of acetyl chloride is warmed gently until a solution results. The clear solution is refluxed for about an hour and the excess acetyl chloride distilled off under reduced pressure.

34.5 g. of pyridine hydrochloride is added and the mixture is heated in an oil bath at 190–200° C. for 1¼ hours. The mixture is cooled, water is added and the product is extracted with ether. The ether solution is washed with water and dried over anhydrous magnesium sulfate to yield o-hydroxyatropic acid.

8.2 g. of o-hydroxyatropic acid is treated at reflux temperature with 35 ml. of thionyl chloride for about an hour. The excess thionyl chloride is distilled off, 3 separate portions of benzene added and also distilled off. 11.1 g. of tropine hydrobromide in 35 ml. of dry pyridine is then added and heated for one hour. The mixture is cooled to about 10° C., water is added and the solid filtered and then recrystallized from water. The impure salt is dissolved in water and made basic with 1 N sodium hydroxide and extracted with ether. The ether solution is washed with water and dried over anhydrous magnesium sulfate to yield 3-tropanyl-2-(o-hydroxyphenyl)acrylate.

2.87 g. of 3-tropanyl-2-(o-hydroxyphenyl)acrylate, .89 ml. of formalin and 1.40 g. of piperidine in 10 ml. of amyl alcohol is heated at reflux temperature for 3 hours and the solvent is removed in vacuo to give 3-tropanyl 2(2-hydroxy-3-piperidinomethylphenyl)acrylate.

EXAMPLE 7

2.87 g. of 3-tropanyl-2-(o-hydroxyphenyl)acrylate, 1.98 ml. of formalin and 2.70 g. of piperidine in 10 ml. of butanol is heated at reflux temperature for 3 hours and the solvent is removed to yield 3-tropanyl 2-(2-hydroxy-3,5-dipiperidinomethylphenyl)acrylate.

EXAMPLE 8

Following the procedure of Example 1 and using o-hydroxyphenylacetic acid as a starting material and substituting 1.34 g. of piperidine, 1.15 g. of diethylamine, 1.56 g. of 4-methylpiperidine, 1.58 g. of N-methylpiperazine, 1.12 g. of pyrrolidine and 1.96 g. of 3-azabicyclo[3.2.2]nonane for morpholine to yield respectively 3-tropanyl-2(2-hydroxy-3-piperidinomethylphenyl)-3-phenylacrylate, 3-tropanyl 2(2-hydroxy-3-diethylaminomethylphenyl)-3-phenylacrylate, 3-tropanyl 2[2-hydroxy-3-(2-methylpiperidinomethyl)phenyl] - 3 - phenylacrylate, 3 - tropanyl 2-[2-hydroxy - 3-(2-methyl-1-piperazinylmethyl)phenyl]-3-phenylacrylate, 3 - tropanyl 2(2-hydroxy-3-pyrrolidinomethylphenyl)-3-phenylacrylate and 3-tropanyl 2[2-hydroxy-3-(3 - azabicyclo[3.2.2]nonyl - 3-methyl)phenyl]-3-phenylacrylate.

EXAMPLE 9

2.87 g. of 3 tropanyl-2-(p-hydroxyphenyl)acrylate (as prepared in Example 6), .89 ml. of formalin and 1.40 g. of piperidine in 10 ml. of isoamylalcohol is heated at reflux for 3 hours and the solvent is removed in vacuo to yield 3-tropanyl 2(4-hydroxy-3-piperidinomethylphenyl)acrylate.

EXAMPLE 10

Following the procedure outlined in Example 1, 3.78 g. of 4-piperidinopiperidine was substituted for morpholine to yield 3-tropanyl 2[4-hydroxy-3-(4-piperidinopiperidinomethyl)phenyl]-phenylacrylate.

What is claimed is:

1. A chemical compound of the formula

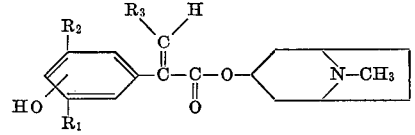

or a pharmaceutically acceptable acid addition salt thereof in which:

$R_1$ is morpholinomethyl, piperidinomethyl, di(loweralkyl)aminomethyl, methylpiperidinomethyl, 4-methyl-1-piperazinylmethyl, pyrrolidinomethyl, 3-azabicyclo[3.2.2]nonyl-3-methyl, or 4-piperidinopiperidinomethyl;

$R_2$ is hydrogen or $R_1$; and $R_3$ is hydrogen, phenyl, furyl, thienyl or pyridyl.

2. A chemical compound in accordance with claim 1 in which $R_1$ is morpholinomethyl and $R_2$ is hydrogen.

3. A chemical compound in accordance with claim 2 in which $R_3$ is phenyl and the hydroxy linkage is para to the acrylate group.

4. A chemical compound in accordance with claim 3 in which the hydroxy linkage is ortho to the acrylate group.

5. A chemical compound in accordance with claim 1 in which $R_1$ and $R_2$ are morpholinomethyl.

6. A chemical compound in accordance with claim 5 in which $R_3$ is phenyl and the hydroxy linkage is para to the acrylate group.

7. A chemical compound in accordance with claim 1 in which $R_1$ is diethylaminomethyl and $R_2$ is hydrogen.

8. A chemical compound in acordance with claim 7 in which $R_3$ is phenyl and the hydroxy linkage is para to the acrylate group.

9. A chemical compound in accordance with claim 1 in which $R_1$ is piperidinomethyl, $R_2$ and $R_3$ are hydrogen and the hydroxy linkage is ortho to the acrylate group.

10. A chemical compound in accordance with claim 9 in which the hydroxy linkage is para to the acrylate group.

References Cited
UNITED STATES PATENTS

| | | | |
|---|---|---|---|
| 3,308,120 | 3/1967 | Caldwell et al. | 260—292 |
| 3,458,507 | 7/1969 | Caldwell et al. | 260—240 |

FOREIGN PATENTS

| | | | |
|---|---|---|---|
| 1,459,785 | 10/1966 | France | 260—240 |

JOHN D. RANDOLPH, Primary Examiner

U.S. Cl. X.R.

260—247.2, 253, 268, 292; 424—267